（12） United States Patent
Vite Cadena

(10) Patent No.: US 11,198,381 B2
(45) Date of Patent: Dec. 14, 2021

(54) MULTIPURPOSE TRAY FOR VEHICLES

(71) Applicant: Nissan North America, Inc., Franklin, TN (US)

(72) Inventor: Manuel Alejandro Vite Cadena, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 204 days.

(21) Appl. No.: 16/419,559

(22) Filed: May 22, 2019

(65) Prior Publication Data

US 2020/0369189 A1 Nov. 26, 2020

(51) Int. Cl.
*B60N 3/00* (2006.01)
*B60R 16/03* (2006.01)
*B60R 7/04* (2006.01)

(52) U.S. Cl.
CPC ............... *B60N 3/002* (2013.01); *B60R 7/04* (2013.01); *B60R 16/03* (2013.01)

(58) Field of Classification Search
CPC ............ B60N 3/002; B60R 7/04; B60R 16/03
USPC .............................................. 296/37.8, 24.34
See application file for complete search history.

(56) References Cited

U.S. PATENT DOCUMENTS

| | | | |
|---|---|---|---|
| 8,196,985 B2 * | 6/2012 | Penner | B60R 7/04 296/24.34 |
| 8,783,752 B2 * | 7/2014 | Lambert | H02J 7/025 296/24.34 |
| 8,919,847 B2 * | 12/2014 | Mather | B60N 2/753 296/24.34 |
| 2005/0017036 A1 | 1/2005 | Dahl et al. | |

FOREIGN PATENT DOCUMENTS

CN 206870993 U 1/2018

* cited by examiner

*Primary Examiner* — Joseph D. Pape
*Assistant Examiner* — Dana D Ivey
(74) *Attorney, Agent, or Firm* — Young Basile Hanlon & MacFarlane, P.C.

(57) ABSTRACT

A vehicle is disclosed that includes: a first (e.g., front) passenger seating area having a console; a second (e.g., rear) passenger seating area that is located rearwardly of the first passenger seating area; a floorpan that extends beneath the first and second passenger seating areas; and a multipurpose tray that is configured for removable connection to the floorpan. The floorpan includes an access port extending therethrough that is located generally adjacent to the console. The multipurpose tray is configured to conceal the access port, and defines at least one compartment that is configured to receive personal effects.

20 Claims, 6 Drawing Sheets

MULTIPURPOSE TRAY FOR VEHICLES

TECHNICAL FIELD

The present disclosure relates to a multipurpose tray for a vehicle, and, more specifically, to a multipurpose tray that is removable from the passenger compartment of the vehicle to conceal and expose an access port extending through the floorpan.

BACKGROUND

Some vehicles include an access port in the floorpan that allows for access to, and the inspection of, various components, such as, for example, the underlying sheet metal, the vehicle's power source (e.g., the battery(ies)) and the associated wiring, electronics, etc. When not in use, the access port is typically concealed by a plastic cover (or the like), which typically serves no other purpose, thus resulting in unused, "dead" space in the passenger compartment.

To address this underutilization, the present disclosure provides a multipurpose tray with one or more compartments adapted to receive personal effects that is removably connectable to the floorpan of the vehicle as so to conceal the access port.

SUMMARY

In one aspect of the present disclosure, a vehicle is disclosed that includes: a first (e.g., front) passenger seating area having a console; a second (e.g., rear) passenger seating area that is located rearwardly of the first passenger seating area; a floorpan that extends beneath the first and second passenger seating areas; and a multipurpose tray that is configured for removable connection to the floorpan. The floorpan includes an access port extending therethrough that is located generally adjacent to the console. The multipurpose tray is configured to conceal the access port, and defines at least one compartment that is configured to receive personal effects.

In certain embodiments, the multipurpose tray may include at least one electrical charging port (e.g., one or more USB ports).

In certain embodiments, the at least one compartment defined by the tray may include a first compartment, and a second compartment that is positioned rearwardly of the first compartment.

In certain embodiments, the second compartment may be fixed in configuration, and may define one or more chambers.

In certain embodiments, the second compartment may be reconfigurable.

In certain embodiments, the second compartment may include at least one movable divider.

In certain embodiments, the at least one movable divider may be generally planar in configuration.

In certain embodiments, the second compartment may include a series of receiving structures that are configured to receive the at least one movable divider to facilitate placement of the at least one movable divider in a plurality of locations so as to define a series of chambers in the second compartment.

In certain embodiments, the multipurpose tray may include a front-end portion that is positioned generally adjacent to the console, and a rear-end portion that is positioned generally adjacent to the second passenger seating area. In such embodiments, the multipurpose tray may include a generally tapered configuration defining a transverse (e.g., horizontal) cross-sectional dimension that increases towards the rear-end portion.

In certain embodiments, the multipurpose tray may define an overall height that varies between the front-end portion and the rear-end portion.

In certain embodiments, the multipurpose tray may define a first height at (adjacent to) the first compartment, and a second height at (adjacent to) the second compartment.

In certain embodiments, the second height may be greater than the first height.

In another aspect of the present disclosure, a multipurpose tray is disclosed that is configured for positioning adjacent to an access port in a floorpan of a vehicle located between front and rear passenger seating areas. The multipurpose tray includes a body defining at least one compartment that is configured to receive personal effects. The body includes a deflectable engagement structure that is configured for releasable connection to a corresponding receipt structure located adjacent to the access port such that the multipurpose tray is removable from the vehicle.

In certain embodiments, the multipurpose tray may include at least one electrical charging port.

In certain embodiments, the at least one compartment may include a first compartment having a fixed configuration, and a second compartment having a variable configuration.

In certain embodiments, the multipurpose tray may further include at least one movable divider that is configured for insertion into a plurality of receiving structures included in (e.g., defined by) the second compartment so as to define a series of reconfigurable chambers in the second compartment.

In certain embodiments, the body of the multipurpose tray may include a front-end portion and a rear-end portion, wherein the body includes a generally tapered configuration defining a transverse (e.g., horizontal) cross-sectional dimension that increases towards the rear-end portion.

In another aspect of the present disclosure, a multipurpose tray is disclosed that is configured to conceal an access port in a floorpan of a vehicle. The multipurpose tray includes: an engagement structure that is configured for releasable connection to corresponding receipt structure located adjacent to the access port such that the multipurpose tray is removable from the vehicle; a first compartment having a fixed configuration; a second compartment having a variable configuration; and opposing first and second end portions.

In certain embodiments, the multipurpose tray may include a generally tapered configuration defining a transverse (e.g., horizontal) cross-sectional dimension that increases towards the second end portion.

In certain embodiments, the second compartment may include a series of receiving structures that are configured to receive at least one movable divider to facilitate placement of the at least one movable divider in a plurality of locations so as to define a series of chambers in the second compartment.

In certain embodiments, the multipurpose tray may further include a pair of opposing sidewalls that extend between the first and second end portions.

In certain embodiments, the multipurpose tray may define a first height at (adjacent to) the first compartment, and a second height at (adjacent to) the second compartment.

In certain embodiments, the second height may be different than the first height such that an overall height of the multipurpose tray varies between the first and second end portions.

BRIEF DESCRIPTION OF THE DRAWINGS

According to common practice, the various features of the drawings may not be to scale, and may be arbitrarily expanded or reduced for clarity.

DETAILED DESCRIPTION

Figure 1:
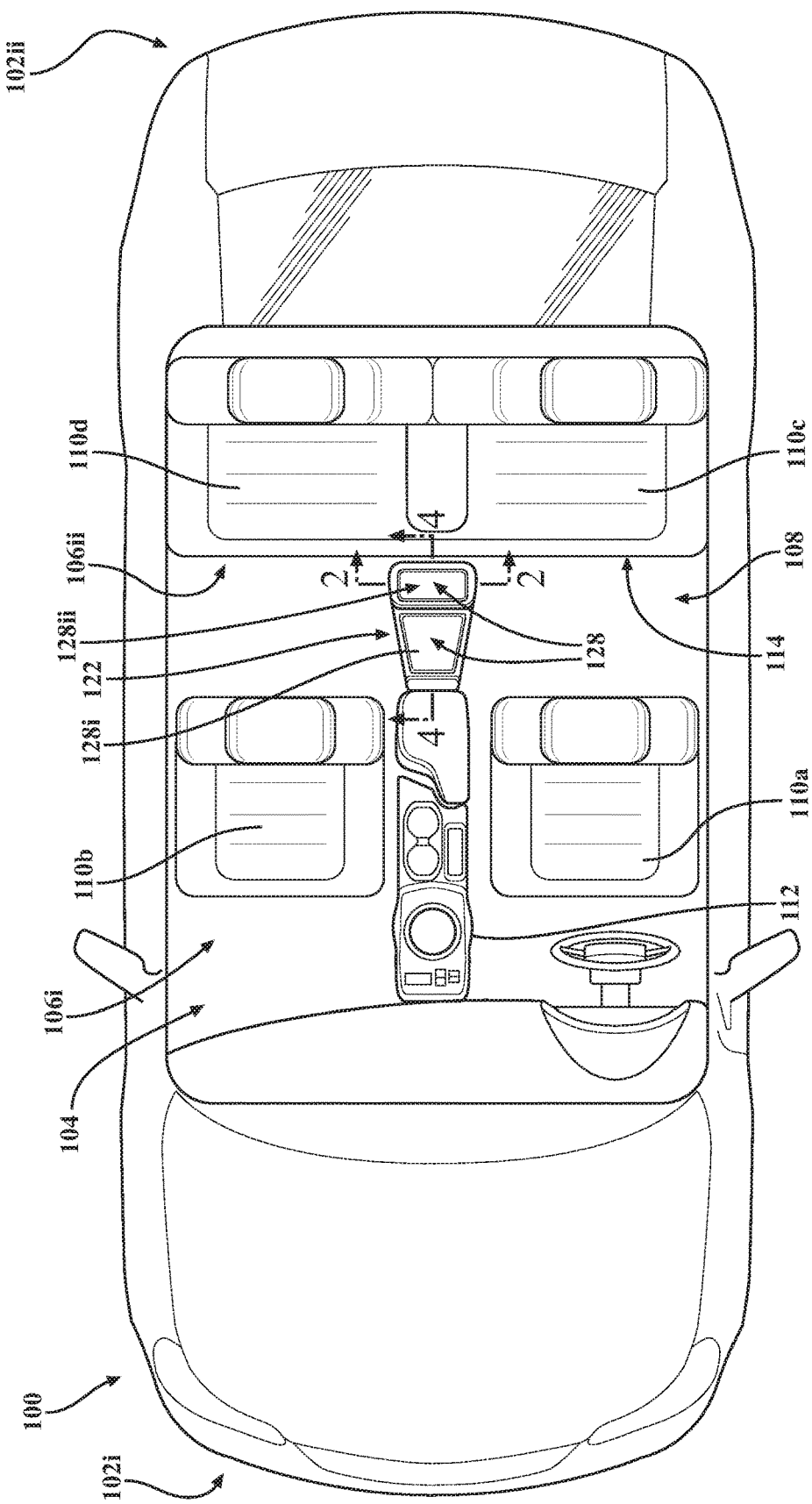
FIG. 1 is a top, plan view of a passenger compartment in a vehicle including a multipurpose tray that is positionable between front and rear passenger seating areas.
Figure 2:
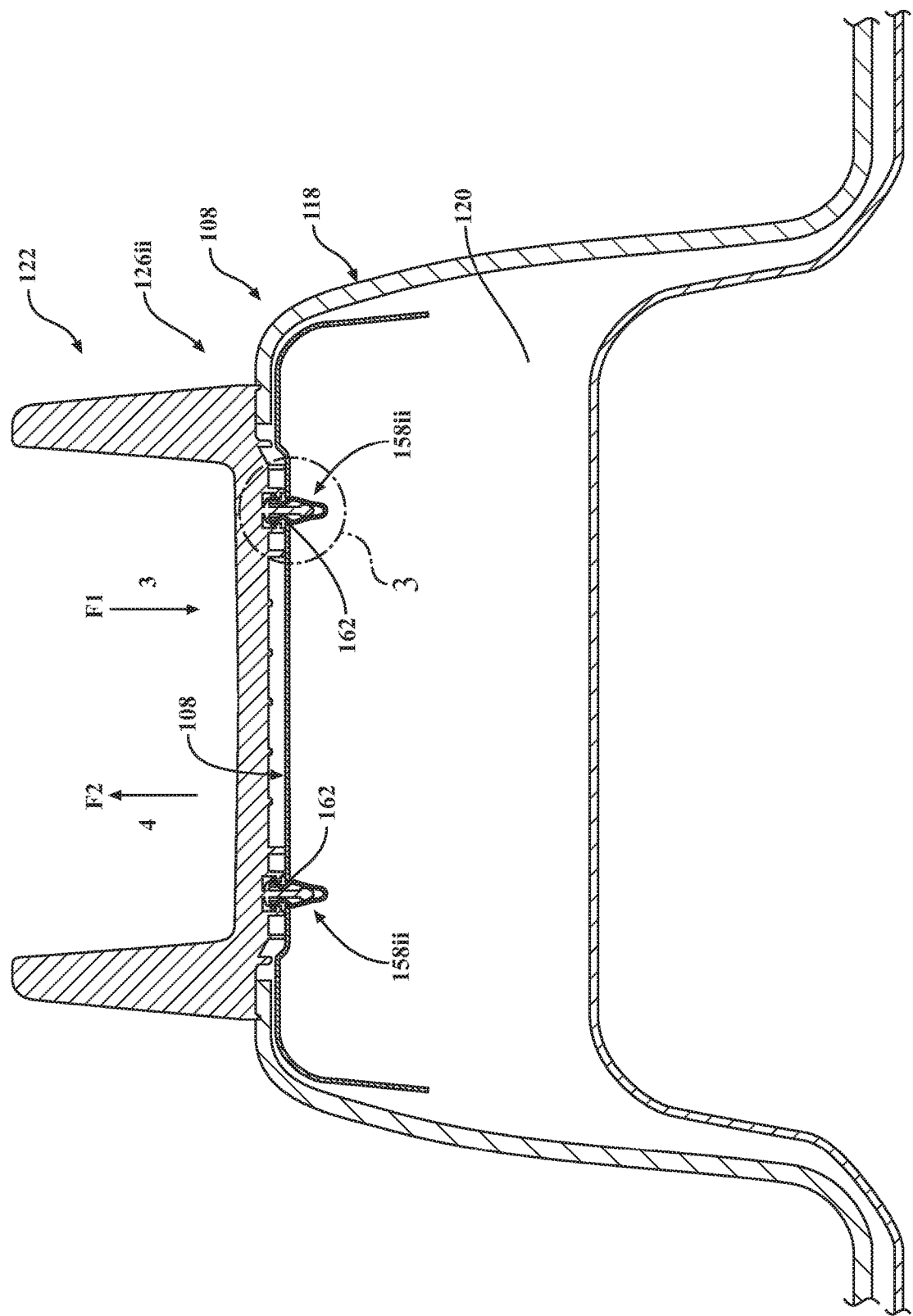
FIG. 2 is a cross-sectional view of the multipurpose tray taken along line 2-2 in FIG. 1.

The present disclosure describes a multipurpose tray that is configured to conceal (or otherwise cover) an access port formed in the floorpan of a vehicle (e.g., between the front and rear seating areas). The multipurpose tray includes one or more compartments that may be used to store the personal effects of one or more passengers in the vehicle. In certain embodiments, it is envisioned that one or more of the compartments may be reconfigurable (e.g., through the use of one or more movable dividers) to allow for customization of the compartment(s), and the accommodation of personal effects that vary in size.

Throughout the present disclosure, the term "personal effects" should be understood to encompass all manner of personal items including, for example, wallets, cell phones or other personal electronic devices, beverage containers, cups, keys, reading materials, etc. Additionally, the term "floorpan" should be understood as generally referring to the floor (or other lower surface) of the vehicle in which the access port is formed, and it should be appreciated that the particular configuration of the floorpan may vary from vehicle to vehicle.

With reference to FIGS. 1-6, a vehicle 100 (FIG. 1) is disclosed that includes respective front- and rear-ends 102*i*, 102*ii*, a passenger compartment 104 with a front (first) passenger seating area 106*i*, a rear (second) passenger seating area 106*ii* located rearwardly of the front passenger seating area 106*i* (i.e., further from the front-end 102*i* of the vehicle 100), and a floorpan 108 that extends beneath the seating areas 106*i*, 106*ii* from the front-end 102*i* of the vehicle 100 to the rear-end 102*ii* of the vehicle 100. In the illustrated embodiment, the front passenger seating area 106*i* includes a pair of discrete seats 110*a*, 110*b* that are separated by a console 112, and the rear passenger seating area 106*ii* includes a pair of seats 110*c*, 110*d* that are connected so as to define a bench 114. It should be appreciated, however, that the particular configuration of the seating areas 106*i*, 106*ii* may be altered in various embodiments without departing from the scope of the present disclosure. For example, it is envisioned that the seats 110*a*, 110*b* may be connected so as to define a bench (similar to the bench 114), and/or that the seats 110*c*, 110*d* may be configured as discrete, separate structures.

The floorpan 108 includes an access port 116 (FIGS. 4, 6) extending therethrough that is configured and positioned to facilitate access to, and the inspection of, the underlying sheet metal (not shown), the power source (e.g., the battery (ies)) (not shown) of the vehicle 100 and the associated wiring, electronics, and other such components. In the specific embodiment of the vehicle 100 shown throughout the figures, the access port 116 is positioned between the passenger seating areas 106*i*, 106*ii* (FIG. 1), and proximate (e.g., generally adjacent) to the console 112. More specifically, the access port 116 is located in an elevated section 118 (FIG. 2) of the floorpan 108 defining a tunnel 120 that accommodates one or more of the aforementioned components (e.g., the power source and the associated wiring). Embodiments of the disclosure are envisioned, however, in which the elevated section 118 may be eliminated.

The vehicle 100 includes a multipurpose tray 122 (FIGS. 1, 2, 4, 6) that is configured to conceal (or otherwise cover) the access port 116 when the access port 116 is not in use. The tray 122 may include (e.g., may be formed from) any suitable material or combination of materials, such as, for example, one or more plastics, polymers, carbon fiber, metallic materials, etc., and may be formed through any suitable manufacturing process, such as, for example, injection molding, casting, 3-D printing, etc.

The tray 122 includes a body 124 (FIG. 6) having opposite front and rear (first and second) end portions 126*i*, 126*ii*, respectively, and defining one or more compartments 128 (FIG. 1) that are configured to receive the personal effects of any passengers (not shown) in the vehicle 100. In the particular embodiment shown throughout the figures, for example, the body 124 of the tray 122 defines a front (first) compartment 128*i*, and a rear (second) compartment 128*ii* that is positioned rearwardly of the front compartment 128*i*. Due to the particular positioning and orientation of the access port 116 formed in the floorpan 108 of the vehicle 100 shown throughout the figures, when installed, the tray 122 is arranged within the passenger compartment 104 such that the front-end portion 126*i* is positioned proximate (e.g., generally adjacent) to the console 112 and the rear-end portion 126*ii* is positioned proximate (e.g., generally adjacent) to the rear passenger seating area 106*ii*.

The body 124 of the tray 122 defines a length L (FIG. 6), a width W, and a height H, and includes a pair of sidewalls 130*i*, 130*ii* that are connected by an upper wall 132 and a series of endwalls 134*i*, 134*ii*, 134*iii*, 134*iv* that extend between the sidewalls 130*i*, 130*ii*. In certain embodiments, such as those shown throughout the figures, it is envisioned that the body 124 may include a generally tapered configuration in which the width W of the body 124 varies along the length L. More specifically, in the illustrated embodiment, the width W of the body 124 increases from the front-end portion 126*i* toward the rear-end portion 126*ii* such that the body 124 defines a generally trapezoidal transverse (horizontal) cross-sectional configuration. It should be appreciated, however, that the particular geometrical configuration of the tray 122 may be varied in alternate embodiments without departing from the scope of the present disclosure (e.g., depending upon the particular configuration of the passenger compartment 104, the arrangement and/or configuration of the respective front and rear passenger seating areas 106*i*, 106*ii*, the desired capacity of the compartments 128*i*, 128*ii*, the configuration and orientation of the access port 116 in the floorpan 108, etc.). For example, an embodiment in which the height W of the body 124 is uniform along the length L (e.g., such that the body 124 defines a generally rectangular transverse (horizontal) cross-sectional configuration) would not be beyond the scope of the present disclosure.

Figure 4:
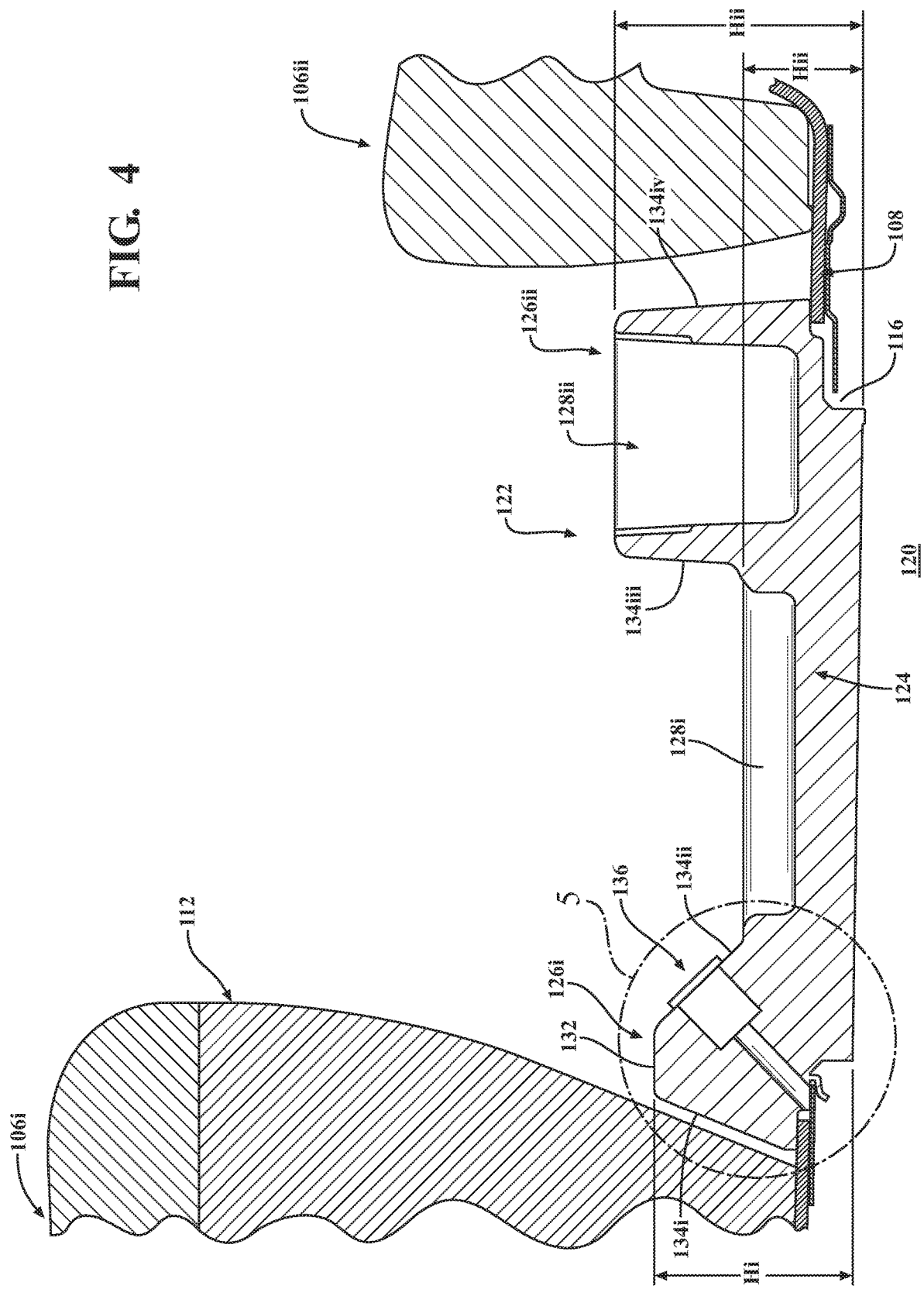
FIG. 4 is a cross-sectional view of the multipurpose tray taken along line 4-4 in FIG. 1.
Figure 6:
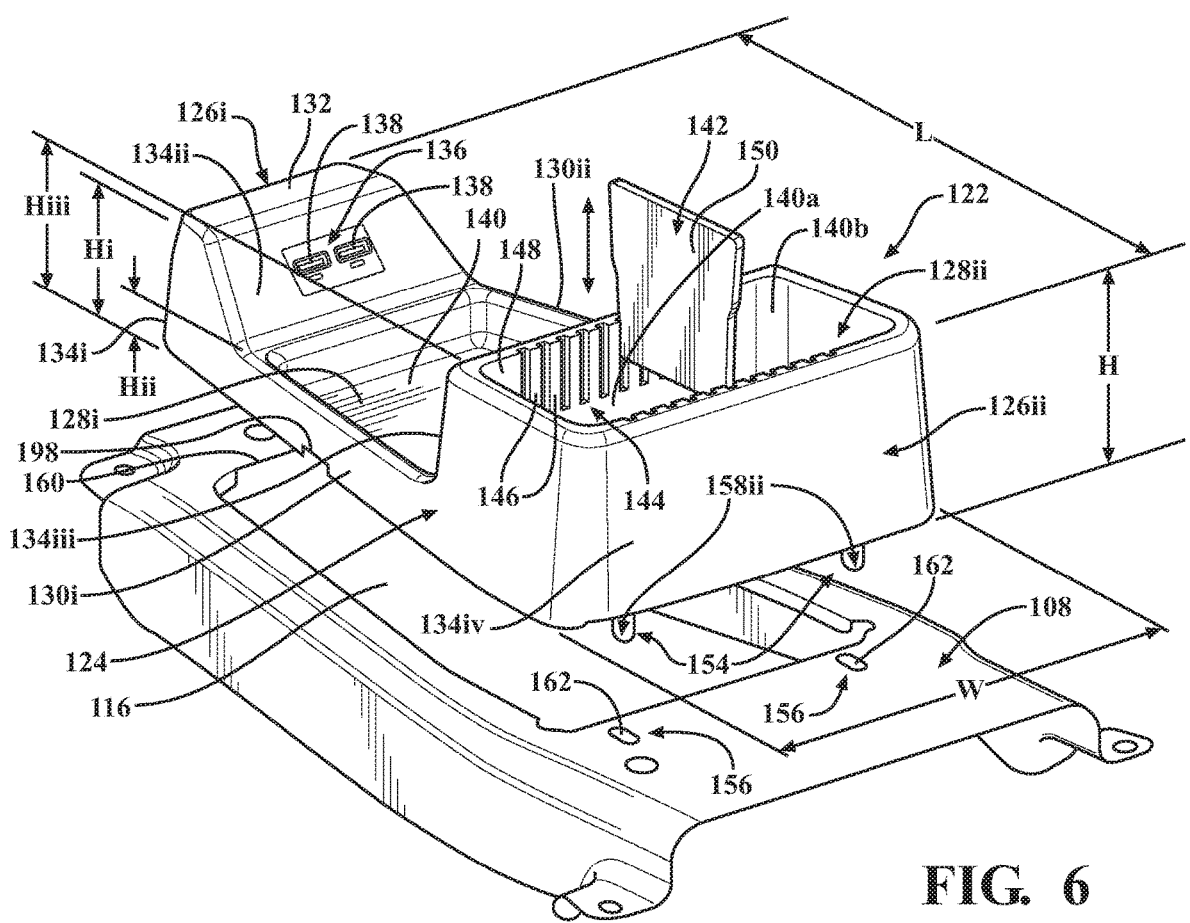
FIG. 6 is a top, perspective view of the multipurpose tray, shown with a removable divider, illustrating connection of the multipurpose tray to the floorpan of the vehicle.

As seen in FIGS. 4 and 6, in certain embodiments, it is envisioned that the overall height H of the body 124 may vary along the length L. More specifically, in the illustrated embodiment, the body 124 of the tray 122 is configured such that the sidewalls 130*i*, 130*ii* define a first height Hi at the front-end portion 126*i* of the tray 122, a second height Hii at (adjacent to) the compartment 128*i*, and a third height Hiii at (adjacent to) the second compartment 128*ii* and the rear-end portion 126*ii* of the tray 122. It is envisioned that the height Hiii may exceed the height Hi, and that the height Hi may exceed the height Hii, whereby the overall height H of the tray 122 varies non-uniformly along the length L, thereby creating a terraced (tiered) configuration for the tray 122. It should be appreciated, however, that the height(s) H defined by the body 124 of the tray 122 may be varied in alternate embodiments without departing from the scope of the present disclosure (e.g., depending upon the particular configuration of the passenger compartment 104, the arrangement and/or configuration of the respective front and rear passenger seating areas 106*i*, 106*ii*, the desired capacity of the compartments 128*i*, 128*ii*, etc.). For example, embodiments in which the height H varies uniformly along the length L, or in which the height H of the body 124 is uniform between the front-end portion 126*i* of the tray 122 and the rear-end portion 126*ii* of the tray 122, would not be beyond the scope of the present disclosure.

As seen in FIG. 4, the endwalls 134*i*, 134*ii*, 134*iii*, 134*iv* each include a tapered configuration (e.g., so as to generally correspond to the configuration of the empty space defined within the passenger compartment 104 between the passenger seating areas 106*i*, 106*ii*). More specifically, the endwalls 134*i*, 134*iii* are angled towards the rear passenger seating area 106*ii*, and the endwalls 134*ii*, 134*iv* are angled towards the console 112 and the front passenger seating area 106*i*. It should be appreciated, however, that the particular configurations of the endwalls 134*i*, 134*ii*, 134*iii*, 134*iv* may be varied in alternate embodiments without departing from the scope of the present disclosure (e.g., depending upon the particular configuration of the passenger compartment 104, the arrangement and/or configuration of the respective front and rear passenger seating areas 106*i*, 106*ii*, etc.). Additionally, although the upper wall 132 is shown as being generally planar in configuration, and as extending in generally parallel relation to the floorpan 108, it is envisioned that the configuration of the upper wall 132 may be varied in alternate embodiments of the tray 122, or that the upper wall 132 may be eliminated altogether (e.g., such that the endwall 134*i* intersects the endwall 134*ii*).

In certain embodiments of the disclosure, such as those shown throughout the figures, the body 124 of the tray 122 may also include one or more electrical charging ports 136, as seen in FIG. 6, for example. Although shown as being included on the endwall 134*ii* and as including a pair of USB charging ports 138, the particular location and/or configuration of the charging ports 136 may be varied in alternate embodiments without departing from the scope of the present disclosure. For example, it is envisioned that one or more of the electrical charging ports 136 may be included on the upper wall 132 and/or that one or more of the electrical charging ports 136 may be configured to receive a two or three-pronged electrical plug, a lightning cable, etc.

With reference to FIG. 6 in particular, the compartments 128 will be discussed. The compartments 128 define chambers 140 that are configured to receive one or more personal effects of any passengers within the vehicle 100. Whereas, in the illustrated embodiment, the compartment 128*i* includes a defined, fixed (i.e., non-variable) configuration, the compartment 128*ii* is reconfigurable. More specifically, the compartment 128*ii* can be separated into a plurality of chambers 140*a*, 140*b* via one or more movable dividers 142, which may include (e.g., may be formed from) any suitable material or combination of materials, such as, for example, one or more plastics, polymers, carbon fiber, metallic materials, etc. Illustratively, as shown throughout the figures, the divider(s) 142 may be configured for removable insertion into one or more receiving structures 144, which may be configured as slots 146 (or other such suitable openings), included on (or defined by) an inner wall 148 of the compartment 128*ii*, such that the configuration (volume) of the chambers 140 defined within the compartment 128*ii* by the divider(s) 142 may be varied as needed via movement and placement of the divider(s) 142 in a plurality of locations.

In the embodiment of the tray 122 shown throughout the figures, the divider(s) 142 are illustrated as plates 150 that are generally planar in configuration, and the receiving structures 144 (e.g., the slots 146) are configured as being generally linear in configuration (i.e., to permit insertion and removal of the plate(s) 150). It should be appreciated, however, that the particular configuration of the divider(s) 142 and the receiving structure(s) 144 may be varied in alternate embodiments without departing from the scope of the present disclosure. For example, embodiments in which the divider(s) 142 and the receiving structure(s) 144 include a curved configuration (e.g., to facilitate the reception of a beverage container) would not be beyond the scope of the present disclosure.

While the divider(s) 142 are shown throughout the figures as being configured for removable insertion into the receiving structure(s) 144 (i.e., such that the divider(s) 142 are separable from the tray 122), it is also envisioned that the divider(s) 142 may be non-removably connected to the body 124 of the tray 122 (e.g., to eliminate the likelihood of loss or misplacement of the divider(s) 142). For example, it is envisioned that the divider(s) 142 may be slidable within a track (not shown) included on (or defined by) the inner wall 148 of the compartment 128*ii*. Additionally, or alternatively, it is envisioned that the divider(s) 142 may be connected to the body 124 of the tray 122 by one or more biasing members (not shown) (e.g., spring(s), elastic bands, or the like).

Figure 7:
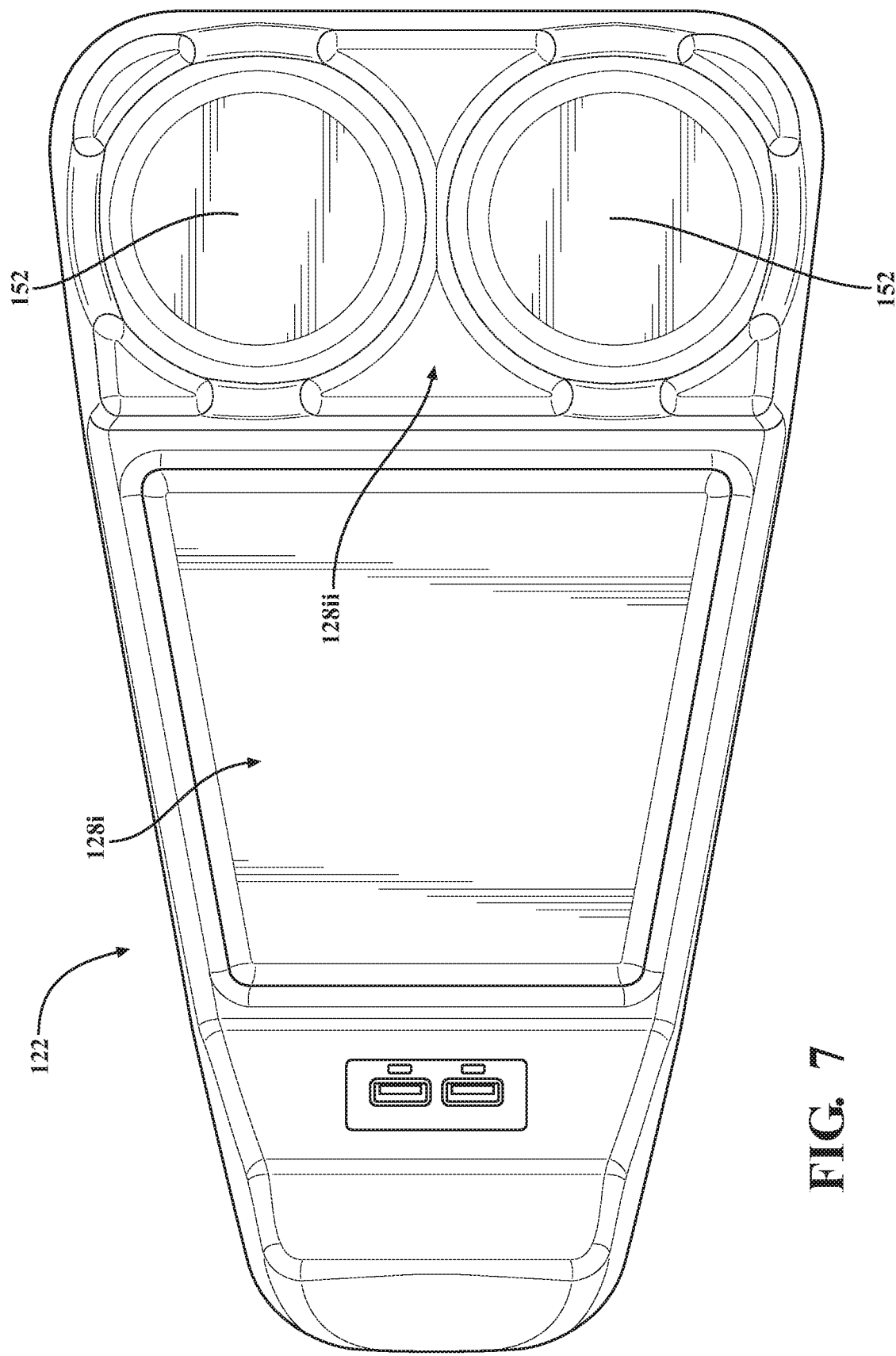
FIG. 7 is a top, plan view of an alternate embodiment of the multipurpose tray including a pair of cupholders.

While the compartments 128*i*, 128*ii* have been described hereinabove as including fixed and variable configurations, respectively, it is envisioned that the configurations of the compartments 128*i*, 128*ii* may be reversed or varied in alternate embodiments of the disclosure. For example, embodiments are envisioned in which the configuration of the compartment 128*i* may be variable and the configuration of the compartment 128*ii* may be fixed, as are embodiments in which each of the compartments 128*i*, 128*ii* may be fixed in configuration (e.g., embodiments in which the tray 122 is devoid of the divider(s) 142). For example, FIG. 7 illustrates an embodiment of the tray 122 including the aforedescribed compartment 128*i*, but in which the compartment 128*ii* includes a pair of cupholders 152. Embodiments are also envisioned in which the compartments 128*i*, 128*ii* may each be variable in configuration. For example, it is envisioned that each of the compartments 128*i*, 128*ii* may be reconfigurable via utilization of the divider(s) 142, or that one or more of the cupholders 152 (FIG. 7) may be variable in dimension to accommodate beverage containers of different sizes.

In certain embodiments of the disclosure, it is envisioned that one or more of the compartments 128 may include a removable insert (not shown) (e.g., to allow for cleaning and the removal of dirt, crumbs, dust, coins, debris, etc.).

Although the tray 122 has been described herein above as including a pair of compartments 128*i*, 128*ii*, it should be appreciated that the particular number of compartments 128, and/or the configuration of the compartments 128, may be varied in alternate embodiments without departing from the scope of the present disclosure. For example, embodiments including a single compartment 128, or three or more compartments 128, would not be beyond the scope of the present disclosure.

With reference again to FIGS. 1-6, the tray 122 is configured for removable connection to the floorpan 108. More specifically, the body 124 of the tray 122 includes engagement structure 154 (FIG. 6) that is configured for releasable connection to corresponding receipt structure 156 located adjacent to the access port 116 in the floorpan 108. For example, in the particular embodiment of the tray 122 shown throughout the figures, the engagement structure 154 includes one or more clips 158*i* positioned at the front-end portion 126*i* of the body 124 that are configured for engagement with a flange 160 defined by the access port 116, and one or more clips 158*ii* positioned at the rear-end portion 126*ii* of the body 124 that are configured for engagement with corresponding openings 162 formed in the floorpan 108 adjacent to the access port 116. In various embodiments of the disclosure, it is envisioned that the clips 158*i* and/or the clips 158*ii* may be formed from the same material as the body 124 of the tray 122, or from different materials. For example, in one embodiment, it is envisioned that the body 124 may include (e.g., may be formed partially or entirely from) plastic, and that the clips 158*i*, 158*ii* may include (e.g., may be formed partially or entirely from) a metallic material, such as spring steel, for example.

Figure 5:
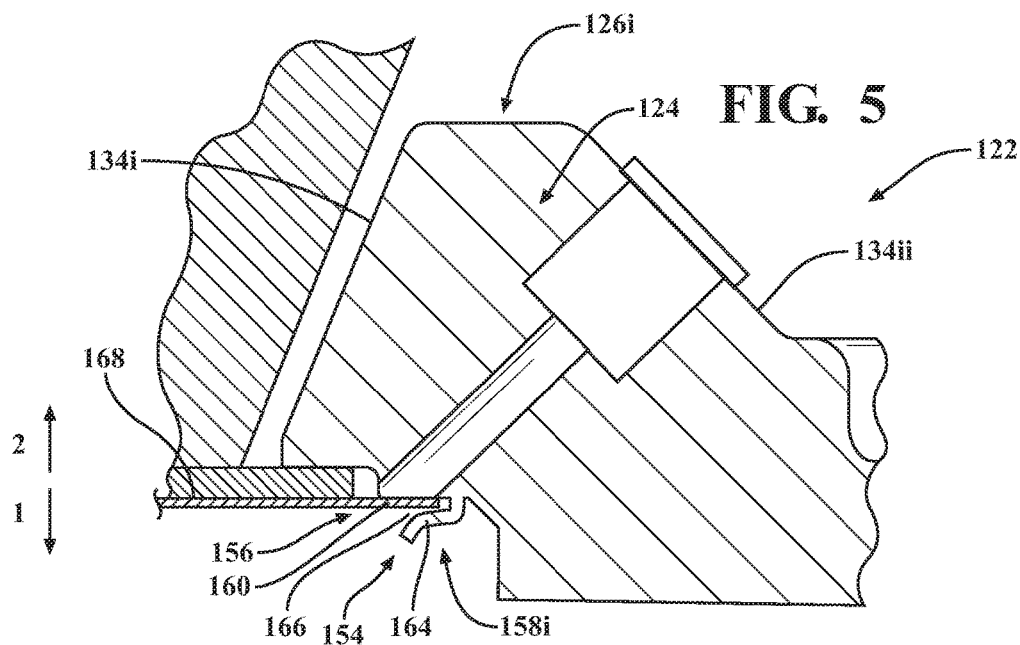
FIG. 5 is an enlargement of the area of detail identified in FIG. 4.

As seen in FIG. 5, the clip(s) 158*i* include an arm 164 defining a receiving space 166 that is configured to accommodate the flange 160. To facilitate connection of the clip(s) 158*i* to the flange 160, it is envisioned that the clip(s) 158*i* (e.g., the arm(s) 164) may include (e.g., may be formed partially or entirely from) one or more flexible (deformable) materials, such as, for example, plastics, polymers, spring steel, etc. In such embodiments, it is envisioned that the arm(s) 164 may be deflected (or otherwise displaced) outwardly (i.e., away from the flange 160) in a first direction (identified by arrow 1 in FIG. 5) during connection of the clip(s) 158. Deflection of the arm(s) 164 creates an opposing biasing force in a second direction (identified by arrow 2 in FIG. 5) opposite to the first direction that functions to secure the clip(s) 158*i* to the flange 160 by compressing the flange 160 between the arm 164 and an underside 168 of the body 124 of the tray 122.

Figure 3:
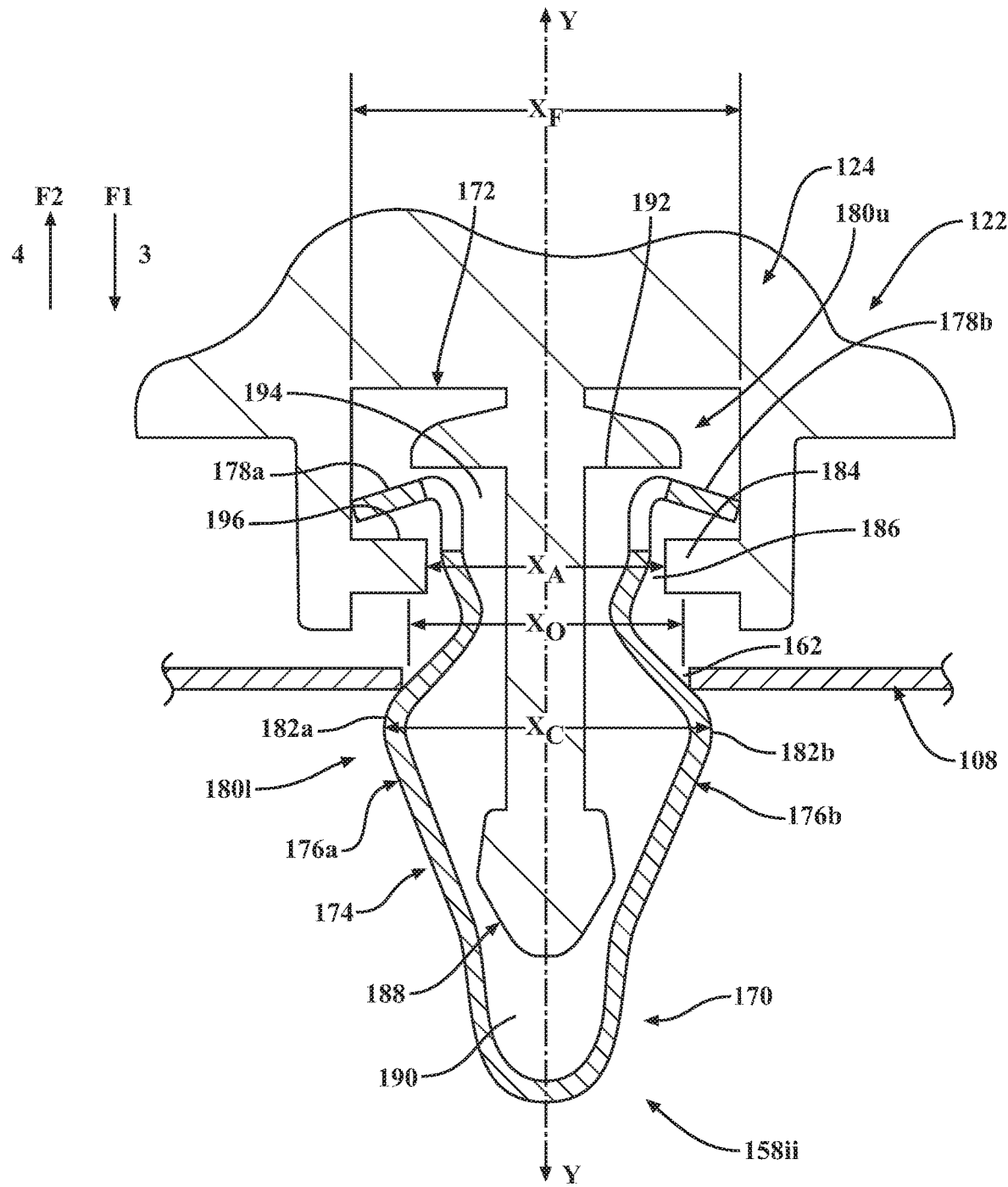
FIG. 3 is an enlargement of the area of detail identified in FIG. 2.

With reference to FIG. 3, each of the clips 158*ii* is configured as a spring clip 170 that is received within a corresponding receptacle 172 defined by the body 124 of the tray 122. More specifically, each clip 158*ii* includes a body portion 174 with a pair of legs 176*a*, 176*b* defining feet 178*a*, 178*b*, respectively, that extend outwardly therefrom (i.e., away from a central longitudinal axis Y defined by the clip 158*ii*). The body portion 174 of each clip 158*ii* includes respective upper and lower portions 180*u*, 180*l* that each taper inwardly (i.e., towards the central longitudinal axis Y defined by the clip 158*ii*) so as to facilitate insertion of the upper portion 180*u* into the receptacle 172, and insertion of the lower portion 180*l* into the opening(s) 162 formed in the floorpan 108 adjacent to the access port 116 (FIGS. 4, 6). The respective upper and lower portions 180*u*, 180*l* intersect so as to define elbows 182*a*, 182*b* that are configured to resist withdrawal of the clip(s) 158*ii* from the opening(s) 162. More specifically, at the elbows 182*a*, 182*b*, the clip(s) 158*ii* define a transverse cross-sectional dimension XC that exceeds the transverse cross-sectional dimension XO defined by the opening(s) 162.

With continued reference to FIG. 3, the receptacle(s) 172 each define a shoulder 184 that extends inwardly so as to define an aperture 186. The shoulder 184 is configured such that the aperture 186 defines a transverse cross-sectional dimension XA that is less than a transverse cross-sectional dimension XF normally defined by the feet 178*a*, 178*b* of the clip 158*ii* (i.e., in the absence of an inwardly compressive force). In various embodiments of the disclosure, it is envisioned that the receptacle(s) 172 may be integrally (e.g., monolithically) formed with the body 124 of the tray 122, as shown throughout the figures. Alternatively, however, it is envisioned that the receptacle(s) 172 may be formed separately, and attached (or otherwise connected) to the body 124. For example, the receptacle(s) 172 may be formed as buttons that are press-fit into the body 124.

To reinforce the clips 158*ii*, and facilitate proper reception of the clips 158*ii* by the receptacle 172, the body 124 of the tray 122 may further include a peg 188 that extends downwardly therefrom such that the peg 188 is positionable within an internal space 190 defined between the legs 176*a*, 176*b* of the clips 158*ii*. As can be appreciated through reference to FIG. 3, the peg 188 is configured to provide structural rigidity to the clip 158*ii* upon positioning within the receptacle(s) 172 by resisting transverse (lateral) movement, deflection, etc., of the clip 158*ii*. In the particular embodiment illustrated, each peg 188 includes a radial stop 192 defining a gap 194 with the shoulder 184 that is configured to accommodate the upper portion 180*u* of an inserted clip 158*ii* (e.g., the feet 178*a*, 178*b*). The stop 192 is configured and positioned to limit insertion of the clips 158*ii* into the receptacle 172 such that the elbows 182*a*, 182*b* remain positioned beneath the floorpan 108.

Although the tray 122 is shown as including a single clip 158*i* and a pair of clips 158*ii* in the embodiment seen throughout the figures, it should be appreciated that the particular number and configuration of the clip(s) 158*i* and/or the clip(s) 158*ii* may be varied in alternate embodiments without departing from the scope of the present disclosure. For example, an embodiment in which the tray 122 includes a single clip 158*i* that is configured to span a front-end portion of the access port 116 (rather than a series of discrete, individual clips 158*i*) would not be beyond the scope of the present disclosure.

Additionally, embodiments of the tray 122 are envisioned in which the body 124 may include a series of identical clips 158 (i.e., embodiments in which the body 124 of the tray 122 may include the clips 158*i* or the clips 158*ii* exclusively). Illustratively, it is envisioned that the floorpan 108 may be devoid of the openings 162 (FIG. 6), and that the tray 122 may be secured to the flange 160 exclusively through the employ of one or more clips 158*i*. Alternatively, it is envisioned that the floorpan 108 may include a series of openings 162 (e.g., spaced about a periphery of the access port 116), and that the tray 122 may include clips 158*ii* (exclusively). In such embodiments, for example, the clips 158*ii* may be located at the respective front- and rear-end portions 126*i*, 126*ii* of the tray 122, as well as in any other suitable or requisite location (e.g., along the length L of the body 124).

With reference again to FIGS. 1-6, assembly and use of the mutlipurpose tray 122 will be discussed, as well as installation and removal of the tray 122 from the vehicle 100.

To assemble the clips 158*ii* (FIG. 3) and the body 124 of the tray 122, the upper portion 180*u* of each clip 158*ii* is press-fit into a corresponding receptacle 172. More specifically, a compressive force is (manually) applied to the legs 176*a*, 176*b* to compress the legs 176*a*, 176*b* inwardly (i.e., towards the central longitudinal axis Y) so as to approximate the feet 178*a*, 178*b*, and thereby facilitate passage of the feet 178*a*, 178*b* through the aperture 186 defined by the shoulder 184 of each receptacle 172. The compressive force is then removed, whereby the legs 176*a*, 176*b* are allowed to expand such that the feet 178*a*, 178*b* are positioned within the gap 194. When so positioned, the feet 178*a*, 178*b* are positioned for contact with an inner (upper) surface 196 defined by the shoulder 184 so as to resist withdrawal of the clips 158*ii* from the receptacle 172.

To disassemble the clips 158*ii* and the body 124 of the tray 122 (e.g., during replacement, repair, cleaning, etc.), the process is reversed. More specifically, each clip 158*ii* is compressed inwardly so as to approximate the feet 178*a*, 178*b*, and thereby facilitate withdrawal of the feet 178*a*, 178*b* from the aperture 186 defined by the shoulder 184 of each receptacle 172.

In order to connect the tray 122 to the floorpan 108, the clip(s) 158*i* are connected to the flange 160 (as shown in FIG. 5) via positioning of the flange 160 within the receiving space 166 such that the arm(s) 164 are positioned beneath the floorpan 108. Additionally, the clip(s) 158*ii* (FIGS. 2, 3) are press-fit into the openings 162 (e.g., through corresponding holes in the interior carpet or other such floor covering in the vehicle 100) via the application of a force F1 (e.g., in the direction indicated by arrow 3). As the force F1 is applied to the tray 122, due to the tapered configuration of the lower portion 180*l* of each clip 158*ii*, the legs 176*a*, 176*b* are deflected inwardly (i.e., towards the central longitudinal axis Y) until the elbows 182*a*, 182*b* are positioned beneath the opening(s) 162 in the floorpan 108, at which time, the legs 176*a*, 176*b* expand outwardly such that the clip(s) 158*ii* are retained in place via engagement of the elbows 182*a*, 182*b* and the sections of the floorpan 108 defining the opening(s) 162. Following connection of the tray 122 to the floorpan 108, the clips 158*i*, 158*ii* inhibit movement of the tray 122 relative to the floorpan 108, as well as inadvertent disconnection of the tray 122.

Once positioned in the vehicle 100, the tray 122 can be utilized to store the personal effects of the passengers (not shown). For example, the compartment 128*i* (FIGS. 1, 6) may be used to store one or more personal electronic devices, which may be charged via the charging port(s) 136, and the compartment 128*ii* may be used to store one or more beverage containers. Via relocation of the divider(s) 142, the configuration(s) and size(s) of the chamber(s) 140 may be customized so as to adapt to the particular nature and size of the personal effects to be stored therein.

To remove the tray 122 from the vehicle 100 (e.g., to reveal the access port 116 in the floorpan 108 during inspection and/or service of the vehicle 100), a removal force F2 (FIGS. 2, 3) is applied to the tray 122 (e.g., in the direction indicated by arrow 4) to separate the clip(s) 158*i* (FIG. 5) from the flange 160 and remove the clip(s) 158*ii* from the opening(s) 162. More specifically, as the removal force F2 is applied, the clip(s) 158*i* are compressed by the sections of the floorpan 108 defining the opening(s) 162 (FIGS. 3, 6), which is facilitated by the tapered configuration of the upper portion 180*u* of each clip 158*ii*, so as to deflect the legs 176*a*, 176*b* inwardly (i.e., towards the central longitudinal axis Y). Compression of the clip(s) 158*ii* continues until the legs 176*a*, 176*b* are sufficiently approximated to allow for passage of the elbows 182*a*, 182*b* through the opening(s) 162, at which time, the clip(s) 158*ii* can be removed from the opening(s) in the floorpan 108 to allow for separation of the tray 122.

It is envisioned that the withdrawal force F2 (FIGS. 2, 3) may be applied to the tray 122 either manually, or via the use of a tool (e.g., a screwdriver, a pry bar, etc.) (not shown). To facilitate the application of the withdrawal force F2, it is envisioned that the body 124 of the tray 122 may include one or more notches 198 (FIG. 6) that are configured to receive an end of the tool such that leverage can be applied to the tray 122 to lift the tray 122 away from the floorpan 108, thereby separating the clips 158*i*, 158*ii* (FIGS. 3, 5) from the flange 160 and the openings 162, respectively. Although the tray 122 is shown as including a single notch 198 on the sidewall 130*i*, it should be appreciated that the number and/or particular location of the notch(es) 198 may be varied in alternate embodiments of the disclosure. For example, it is envisioned that one or more notch(es) 198 may be included on the sidewall 130*ii* and/or on the endwalls 134*i*, 134*iv*.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward,"

"downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle, comprising:
    a first passenger seating area including a console;
    a second passenger seating area located rearwardly of the first passenger seating area;
    a floorpan extending beneath the first and second passenger seating areas, the floorpan including an access port extending therethrough located generally adjacent to the console; and
    a multipurpose tray configured for removable connection to the floorpan, the multipurpose tray being configured to conceal the access port, and defining at least one compartment configured to receive personal effects.

2. The vehicle of claim 1, wherein the multipurpose tray includes at least one electrical charging port.

3. The vehicle of claim 2, wherein the at least one electrical charging port includes at least one USB port.

4. The vehicle of claim 1, wherein the at least one compartment includes a first compartment, and a second compartment positioned rearwardly of the first compartment.

5. The vehicle of claim 4, wherein the second compartment is fixed in configuration, and defines one or more chambers.

6. The vehicle of claim 4, wherein the second compartment is reconfigurable.

7. The vehicle of claim 6, wherein the second compartment includes at least one movable divider.

8. The vehicle of claim 7, wherein the at least one movable divider is generally planar in configuration.

9. The vehicle of claim 7, wherein the second compartment defines a series of receiving structures configured to receive the at least one movable divider to facilitate placement of the at least one movable divider in a plurality of locations so as to define a series of chambers in the second compartment.

10. The vehicle of claim 4, wherein the multipurpose tray includes a front-end portion positioned generally adjacent to the console, and a rear-end portion positioned generally adjacent to the second passenger seating area, the multipurpose tray including a generally tapered configuration defining a transverse cross-sectional dimension that increases towards the rear-end portion.

11. The vehicle of claim 10, wherein the multipurpose tray defines an overall height varying between the front-end portion and the rear-end portion.

12. The vehicle of claim 11, wherein the multipurpose tray defines a first height at the first compartment, and a second height at the second compartment, the second height being greater than the first height.

13. A multipurpose tray configured for positioning adjacent to an access port in a floorpan of a vehicle located between front and rear passenger seating areas, the multipurpose tray comprising:
    a body configured to conceal the access port in the floorpan, the body defining at least one compartment configured to receive personal effects, the body including deflectable engagement structure configured for releasable connection to corresponding receipt structure located adjacent to the access port such that the multipurpose tray is removable from the vehicle.

14. The multipurpose tray of claim 13, wherein the multipurpose tray includes at least one electrical charging port.

15. The multipurpose tray of claim 13, wherein the at least one compartment includes a first compartment having a fixed configuration, and a second compartment having a variable configuration.

16. The multipurpose tray of claim 15, further including at least one movable divider configured for insertion into a plurality of receiving structures defined by the second compartment so as to define a series of reconfigurable chambers in the second compartment.

17. The vehicle of claim 16, wherein the body includes a front-end portion and a rear-end portion, the body including a generally tapered configuration defining a transverse cross-sectional dimension that increases towards the rear-end portion.

18. A multipurpose tray configured to conceal an access port in a floorpan of a vehicle, the multipurpose tray comprising:
    a body configured to conceal the access port in the floorpan;
    engagement structure extending from the body and configured for releasable connection to corresponding receipt structure located adjacent to the access port such that the multipurpose tray is removable from the vehicle;
    a first compartment having a fixed configuration;
    a second compartment having a variable configuration; and
    opposing first and second end portions, the multipurpose tray including a generally tapered configuration defining a transverse cross-sectional dimension that increases towards the second end portion.

19. The multipurpose tray of claim 18, wherein the second compartment defines a series of receiving structures configured to receive at least one movable divider to facilitate placement of the at least one movable divider in a plurality of locations so as to define a series of chambers in the second compartment.

20. The multipurpose tray of claim 18, wherein the multipurpose tray defines a first height at the first compartment, and a second height at the second compartment, the second height being different than the first height such that an overall height of the multipurpose tray varies between the first and second end portions.

* * * * *